US009253256B2

(12) United States Patent
Arroyo et al.

(10) Patent No.: US 9,253,256 B2
(45) Date of Patent: Feb. 2, 2016

(54) AUTOMATIC MULTIPATH ISCSI SESSION ESTABLISHMENT OVER AN ARBITRARY NETWORK TOPOLOGY

(75) Inventors: Jesse Paul Arroyo, Rochester, MN (US); Josep Cors, Rochester, MN (US); David Lee Dosch, Rochester, MN (US); Mark Harrison Goff, Stewartville, MN (US); Jonathan Louis Kaus, Rochester, MN (US); Kyle Alan Lucke, Oronoco, MN (US); Michael Anthony Migliacio, Rochester, MN (US); Randall Scott Nelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 11/945,318

(22) Filed: Nov. 27, 2007

(65) Prior Publication Data
US 2009/0138608 A1 May 28, 2009

(51) Int. Cl.
*G06F 15/16* (2006.01)
*H04L 29/08* (2006.01)

(52) U.S. Cl.
CPC ........ *H04L 67/1097* (2013.01); *H04L 67/1002* (2013.01); *H04L 67/1006* (2013.01); *H04L 67/14* (2013.01); *H04L 67/141* (2013.01)

(58) Field of Classification Search
CPC . H04L 67/1002; H04L 67/14; H04L 67/1006; H04L 67/141; H04L 67/1097
USPC .......... 709/228, 224, 202, 218, 222, 225, 239
See application file for complete search history.

(56) References Cited

U.S. PATENT DOCUMENTS

| 6,625,747 B1* | 9/2003 | Tawil ................... H04L 47/125 714/6.22 |
| 6,980,521 B1* | 12/2005 | Jarvis ........................... 370/238 |
| 7,068,647 B2* | 6/2006 | Fangman et al. ............. 370/352 |
| 7,461,140 B2* | 12/2008 | Spry et al. ...................... 709/220 |
| 7,526,577 B2* | 4/2009 | Pinkerton et al. ............. 709/249 |
| 7,539,760 B1* | 5/2009 | Petry et al. ..................... 709/227 |
| 7,643,421 B2* | 1/2010 | Tsuge et al. ................... 370/235 |
| 7,702,947 B2* | 4/2010 | Peddada ........................ 714/4.1 |
| 2003/0115447 A1* | 6/2003 | Pham .................. H04L 63/0428 713/153 |
| 2003/0163592 A1* | 8/2003 | Odenwald ............ G06F 3/0601 709/250 |
| 2005/0138184 A1* | 6/2005 | Amir ............................. 709/228 |
| 2005/0182841 A1* | 8/2005 | Sharp ............................ 709/228 |
| 2005/0228835 A1* | 10/2005 | Roa .................... G06F 3/0605 |
| 2006/0085522 A1* | 4/2006 | Spry ............................. 709/220 |
| 2006/0268861 A1* | 11/2006 | Sonoda et al. ................ 370/389 |
| 2006/0277383 A1* | 12/2006 | Hayden et al. ................ 711/170 |
| 2006/0282628 A1* | 12/2006 | Ueoka et al. .................. 711/158 |
| 2007/0058619 A1* | 3/2007 | Gopal Gowda ......... H04L 45/12 370/386 |
| 2007/0174850 A1* | 7/2007 | El Zur .......................... 719/321 |
| 2008/0126525 A1* | 5/2008 | Ueoka ................. H04L 43/0817 709/223 |
| 2008/0140847 A1* | 6/2008 | Almog .......................... 709/228 |
| 2008/0170576 A1* | 7/2008 | Arroyo et al. ............ 370/395.52 |
| 2008/0307099 A1* | 12/2008 | Ueoka et al. .................. 709/228 |
| 2009/0019157 A1* | 1/2009 | Suman et al. ................. 709/225 |
| 2009/0113531 A1* | 4/2009 | Emmerich et al. ................ 726/6 |
| 2009/0187968 A1* | 7/2009 | Roese et al. ...................... 726/1 |

* cited by examiner

*Primary Examiner* — Andrew Georgandellis
*Assistant Examiner* — Anthony Fabbri
(74) *Attorney, Agent, or Firm* — Patterson & Sheridan, LLP

(57) ABSTRACT

A method and apparatus for establishing multiple network sessions over an arbitrary network topology comprises receiving network configuration information describing an initiator system and a target controller. The initiator system contains one or more initiator ports. The target controller contains one or more target ports. Each target port is associated with one or more target nodes. A set of pre-defined rules is identified. The set of pre-defined rules governs the establishment of network sessions between the initiator ports and the target nodes through the target ports. One or more network sessions are established based on the set of pre-defined rules and the network configuration information.

17 Claims, 9 Drawing Sheets

AUTOMATIC MULTIPATH ISCSI SESSION ESTABLISHMENT OVER AN ARBITRARY NETWORK TOPOLOGY

BACKGROUND OF THE INVENTION

1. Field of the Invention

Embodiments of the invention generally relate to managing network connections in a storage area network (SAN).

2. Description of the Related Art

As is known, iSCSI is a storage area network protocol that defines how to flow SCSI storage protocol over an IP network. At one end of the network is an iSCSI initiator system, such as a diskless computer. At the other end of the network is an iSCSI target controller, which has physical ports providing access to logical entities called target nodes. The target nodes provide access to storage or other devices attached to the iSCSI target controller. To create an iSCSI session with a target node, an iSCSI initiator port sends a login message to a specific iSCSI target port. The login may succeed or fail. A successful login establishes an active session between the particular initiator port and target port. An iSCSI initiator system may use an active session to access storage associated with the target node. In complex networks, some iSCSI target ports may be reached only by some of the iSCSI initiator ports, and attempts from other iSCSI initiators will fail to establish an active session.

Further, multiple iSCSI sessions may be established between the initiator ports and the target ports. In such a case, a software application running on the initiator system may include support for a session-based MPIO (multipath input/output). The MPIO software coordinates the initiator system's use of multiple iSCSI sessions. Without this coordination, multiple sessions from the initiator system to the same target node could cause the same storage device to appear multiple times (looking like multiple separate devices) on the iSCSI initiator system. This could lead to data integrity issues and initiator system crashes. Thus, the MPIO software allows safe use of multiple sessions to the same target node.

Additionally, the MPIO software may in some cases perform load balancing and failover when there are multiple sessions to the same target node. One technique to increase for load balancing and failover is to allow the initiator system to access a target node via more than one target port. For example, if a target node may be reached via two physical target ports, the initiator system may establish a separate connection to the target node through each such port. Thus, the initiator system may still access the target node upon failure of either of the target ports. A given network topology may be designed with multiple switches, initiator ports, and target ports to eliminate any single point of failure in the network.

SUMMARY OF THE INVENTION

The present invention generally provides a method and apparatus for establishing multiple network sessions over an arbitrary network topology comprises receiving network configuration information describing an initiator system and a target controller. The initiator system contains one or more initiator ports. The target controller contains one or more target ports. Each target port is associated with one or more target nodes. A set of pre-defined rules is identified. The set of pre-defined rules governs the establishment of network sessions between the initiator ports and the target nodes through the target ports. One or more network sessions is established based on the set of pre-defined rules and the network configuration information.

According to one embodiment, a computer readable storage medium contains a program which, when executed, performs an operation. The operation comprises receiving network configuration information describing an initiator system and a target controller. The initiator system contains one or more initiator ports. The target controller contains one or more target ports. Each target port is associated with one or more target nodes. A set of pre-defined rules is identified. The set of pre-defined rules governs the establishment of network sessions between the initiator ports and the target nodes through the target ports. One or more network sessions is established based on the set of pre-defined rules and the network configuration information.

According to one embodiment, a system comprises a processor and a memory. The memory contains a program that, when executed by the processor, receives network configuration information describing an initiator system and a target controller. The initiator system contains one or more initiator ports. The target controller contains one or more target ports. Each target port is associated with one or more target nodes. A set of pre-defined rules is identified. The set of pre-defined rules governs the establishment of network sessions between the initiator ports and the target nodes through the target ports. One or more network sessions is established based on the set of pre-defined rules and the network configuration information.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
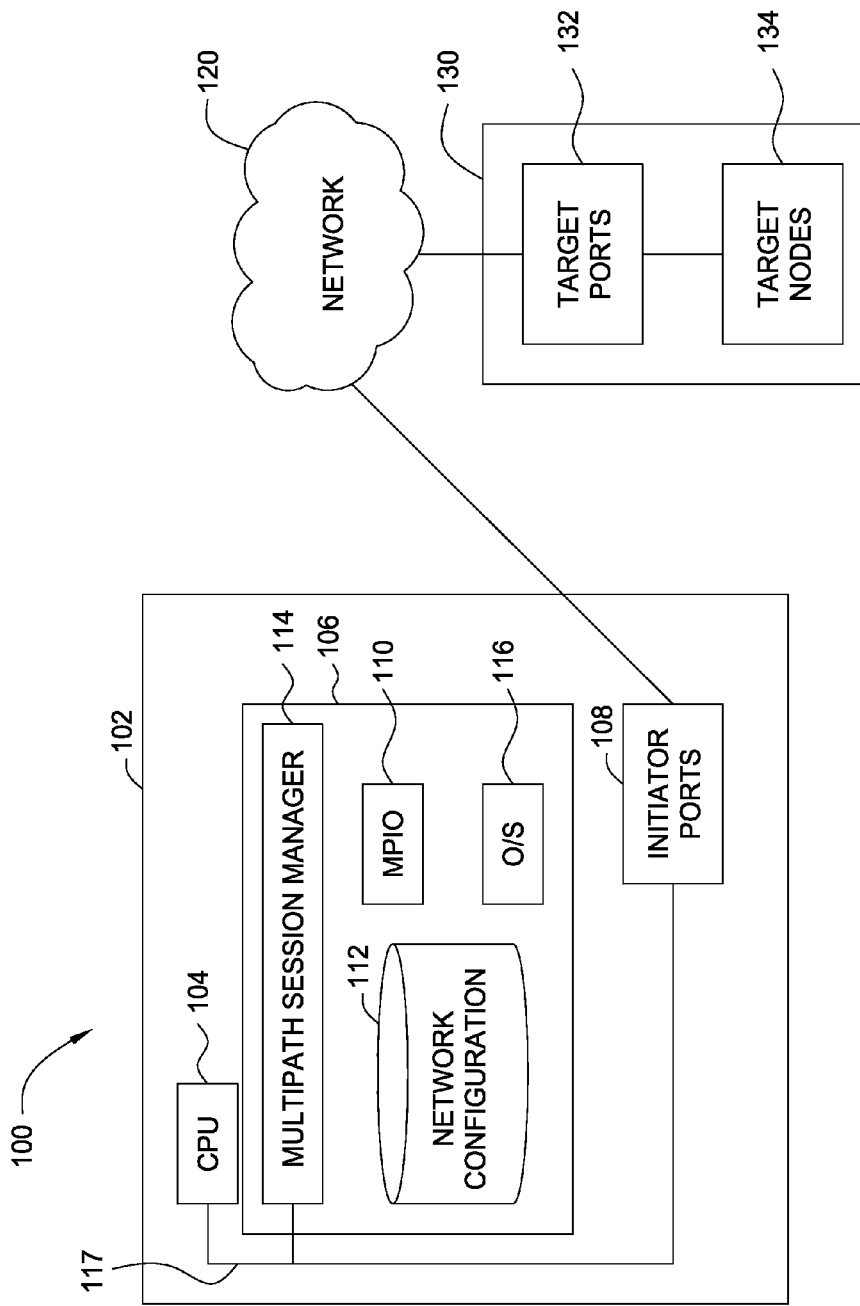
FIG. 1 illustrates a storage area network, according to one embodiment of the invention.

The present invention generally provides a method and apparatus for establishing iSCSI sessions on a network with an unknown topology. Embodiments of the invention may be used to establish multiple iSCSI sessions to provide load balancing and failover capability, e.g., for a network topology that allows are multiple sessions to the same target node.

iSCSI-based storage area networks may be very cost effective as the physical network typically uses inexpensive Ethernet hardware. MPIO software adds valuable load balancing and failover functionality to an iSCSI network. However, configuring an iSCSI MPIO network requires the user must to be knowledgeable about iSCSI, about the specific identifiers in their iSCSI network, including the iSCSI names of initiator ports and target nodes (typically a string of about 80 characters), about the particular network topology, and about tradeoffs related to the optimal number of sessions that should be established to each target node. In one embodiment, the iSCSI initiator system may be configured automatically establish multiple iSCSI sessions by iterating over known initiator and target ports/nodes against a set of pre-defined rules. Doing so allows the initiator system to create multiple iSCSI sessions to provide load balancing and failover capability, without requiring the initiator system to have detailed knowledge of the network topology.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a storage area network (SAN) 100, according to one embodiment of the invention. As shown, SAN 100 includes an iSCSI initiator system 102, a network 120, and an iSCSI target controller 130. The iSCSI initiator system 102 may access an I/O device on the SAN 100. For example, iSCSI initiator system 102 may be a diskless computer configured to accesses a storage device on the SAN 100. The iSCSI initiator system 102 and iSCSI target controller 130 are connected via a network 120. In general, the network 120 may be a local area network (LAN) or a wide area network (WAN), including the Internet.

Illustratively, the iSCSI target controller 130 includes iSCSI target ports 132 and target nodes 134. The iSCSI target ports 132 represent physical ports on target controller 130, e.g., a SCSI host-bus adapter (HBA). Target ports 132 provide iSCSI initiator system 102 with access to target nodes 134. And in turn, the target nodes 134 are logical entities defined for the target ports 132 that provide initiator systems 102 with access to physical devices, e.g., disk-based storage arrays.

As shown, the iSCSI initiator system 102 also includes a central processing unit (CPU) 104, a memory 106, and one or more iSCSI initiator ports 108, connected by a bus 117. The CPU 104 could be any processor used to perform an embodiment of the invention. In one embodiment, iSCSI initiator port 108 may send a login message over network 120 to attempt to create an iSCSI session with a target node 134, using a specific iSCSI target port 132. A successful login establishes an active session, allowing applications running on initiator system 102 to access resources (e.g., storage) over that iSCSI session. The memory 106 is preferably a random access memory sufficiently large to hold the necessary programming and data structures of the invention. While the memory 106 is shown as a single entity, it should be understood that the memory 106 may in fact comprise a plurality of modules, and that the memory 106 may exist at multiple levels, from high speed registers and caches to lower speed but larger DRAM chips.

Illustratively, the memory 106 includes a multi-path input-output (MPIO) application 110, a network configuration 112, a multi-path session manager 114, and an operating system 116. MPIO application 110 includes support for multiple iSCSI sessions between the initiator ports 108 and the target ports 132. That is, the MPIO application 110 may coordinate sessions created by initiator system 102. As described, without this coordination, multiple sessions from the iSCSI initiator system 102 to the same target node 134 may result in the same storage device appearing multiple times on initiator system 102, leading to data integrity issues and crashes on initiator system 102.

The network configuration 112 may be a data structure containing information about the nodes and ports on the SAN 100. In one embodiment, the multi-path session manager 114 may create the network configuration 112 upon completion of the iSCSI initiator system's 102 O/S boot-up operation. Of course, network sessions may be established at any time during the operation of initiator system 102, and iSCSI sessions may be created and removed over time. In one embodiment, the network configuration 112 may include the iSCSI qualified name (IQN) of each target node 134, IP addresses of iSCSI target ports 132, which iSCSI target ports 132 provide access to which target nodes 134, the number of iSCSI initiator ports 108, the IP addresses of the ports 108, and information about established sessions on SAN 100. For example, the information about the established sessions may include the IP address of the iSCSI target port 132, and the IQN of the target node 134 for each session.

In one embodiment, SAN 100 may be configured to support multiple sessions between the same target node 134 and initiator system 102. For example, sessions may be created using different initiator ports 108 or target ports 132. In such a case, the multi-path session manager 114 may evaluate network configuration 112 to establish enough sessions for MPIO application 110 to perform load balancing and failover on SAN. The iSCSI initiator system 102 is generally under the control of an operating system 116. Examples of operating systems 116 include UNIX, versions of the Microsoft Windows® operating system, and distributions of the Linux® operating system. (Note: Linux is at trademark of Linus Torvalds in the United States and other countries.) More generally, any operating 116 system supporting the session manager 114 and communication functions disclosed herein may be used.

Figure 2A:
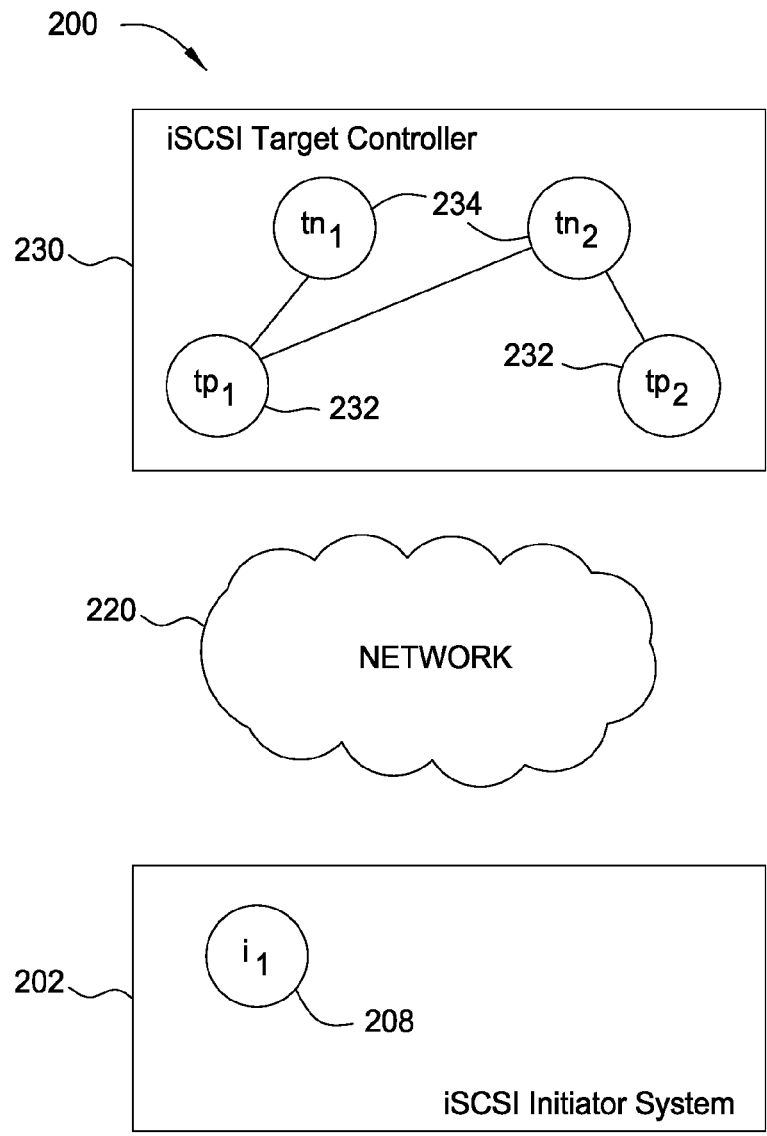
FIGS. 2A-2C illustrate examples of multi-path sessions established for an initiator system with a single iSCSI initiator port, according to one embodiment of the invention.
Figure 2B:
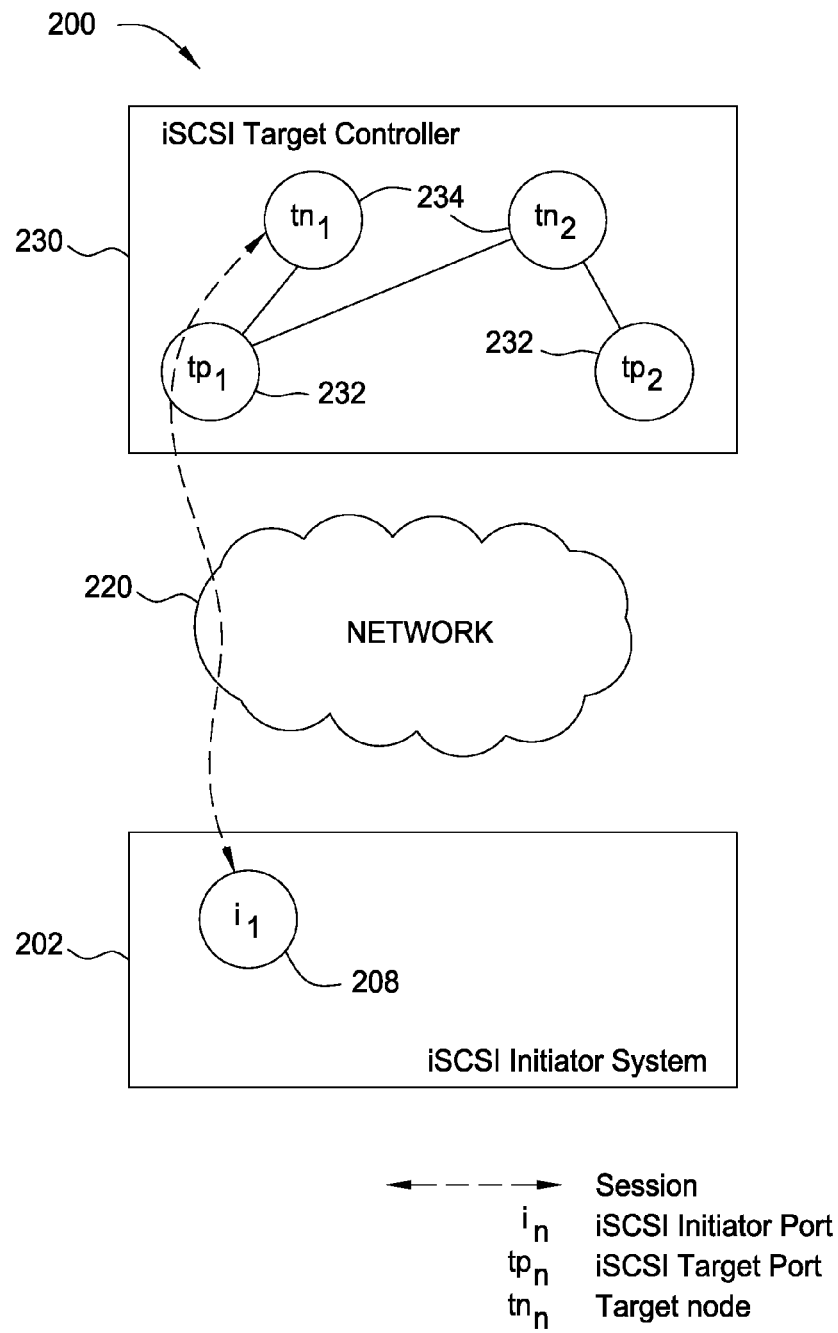
Figure 2C:
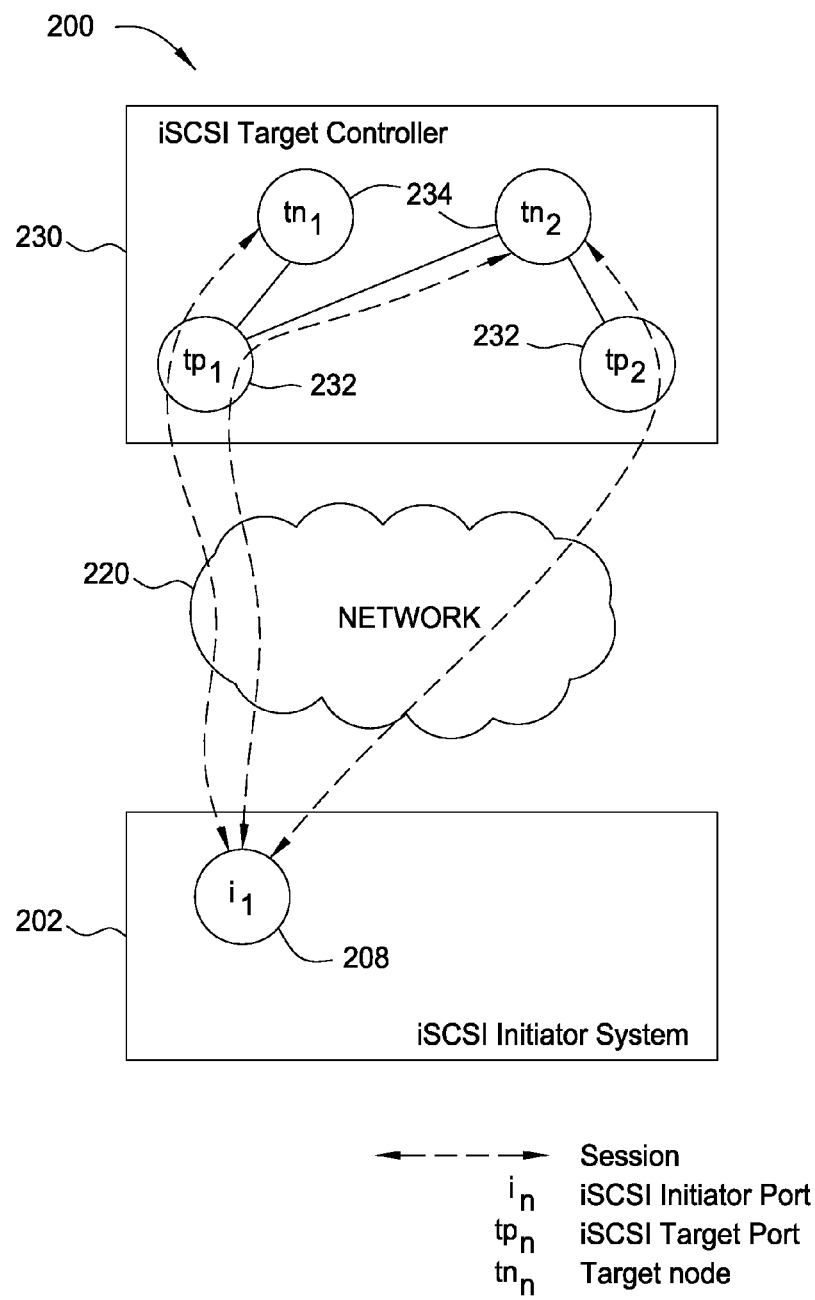

FIGS. 2A-2C illustrate examples of multi-path sessions established for an initiator system with a single iSCSI initiator port, according to one embodiment of the invention. As shown, a SAN 200 includes an iSCSI initiator system 202 (hereinafter initiator), a network 220, and an iSCSI target controller 230. The iSCSI initiator system 202 includes one initiator port labeled 208 "$i_1$." The iSCSI target controller 230 includes two target ports 232, labeled "$tp_{1-2}$," and two target nodes 234, labeled "$tn_{1-2}$." Illustratively, the lines connecting target ports 232 and target nodes 234 indicate which target ports 232 provide access to which target nodes 234. As shown, target port 232 $tp_1$ may be used to access both target nodes 234 $tn_{1-2}$. Target port 232 $tp_2$ may also be used to access target node 234 $tn_2$, but not target node 234 $tn_1$.

FIG. 2B illustrates an example session established in the SAN 200. In an initiator 202 with a single initiator port 208, the multi-path session manager 114 may be configured to establish sessions to each target node 234 as follows: if a target node 234 is associated with only a single target port 232, the session manager 114 establishes a single session to the target node 234 using the single initiator port 208 and the single target port 232. In other words, the session manager 114 may establish a session for each target node 234 that is associated with only a single target port 232 using that target port 232. FIG. 2B illustrates this situation for target node 234 $tn_1$, which is associated with only a single target port 232 $tp_1$. Accordingly, the session manager 114 establishes a single session to the target node 234 $tn_1$, using the single initiator port 208 $i_1$ and the target port 232 $tp_1$. As shown, the session is represented using the dashed arrow connecting initiator port 208 $i_1$ and the target node 234 $tn_1$.

However, if a target node 234 is associated with multiple target ports 232, the session manager 114 may be configured to establish a limited number of sessions to the target node 234 from the single initiator port 208 using multiple target ports 232. The limit on the number of sessions may vary according to implementation details of particular embodiments. For example, the limit could be defined as a system parameter set by an administrator. In some embodiments, the number of participating target ports 232 and/or initiator ports 208 may be the only limiting factors. In other words, the limit could be the total number of possible sessions between the target ports 232 and initiator ports 208 for each target node. For the purposes of discussion, the limit on the number of sessions in the following example is two. As shown in FIG. 2C, target node 234 $tn2$ is associated with both target ports 232 $tp1-2$. Accordingly, the session manager 114 establishes the limited number of sessions (two) to the target node 234 $tn2$. Each session uses the initiator port 208 $i1$. The sessions include a first session represented using the dashed arrow through target port 232 $tp1$ connecting initiator port 208 $i1$ and the target node 234 $tn2$ and a second session represented using the dashed arrow through target port 232 $tp2$ connecting initiator port 208 $i1$ and the target node 234 $tn2$.

Figure 3A:
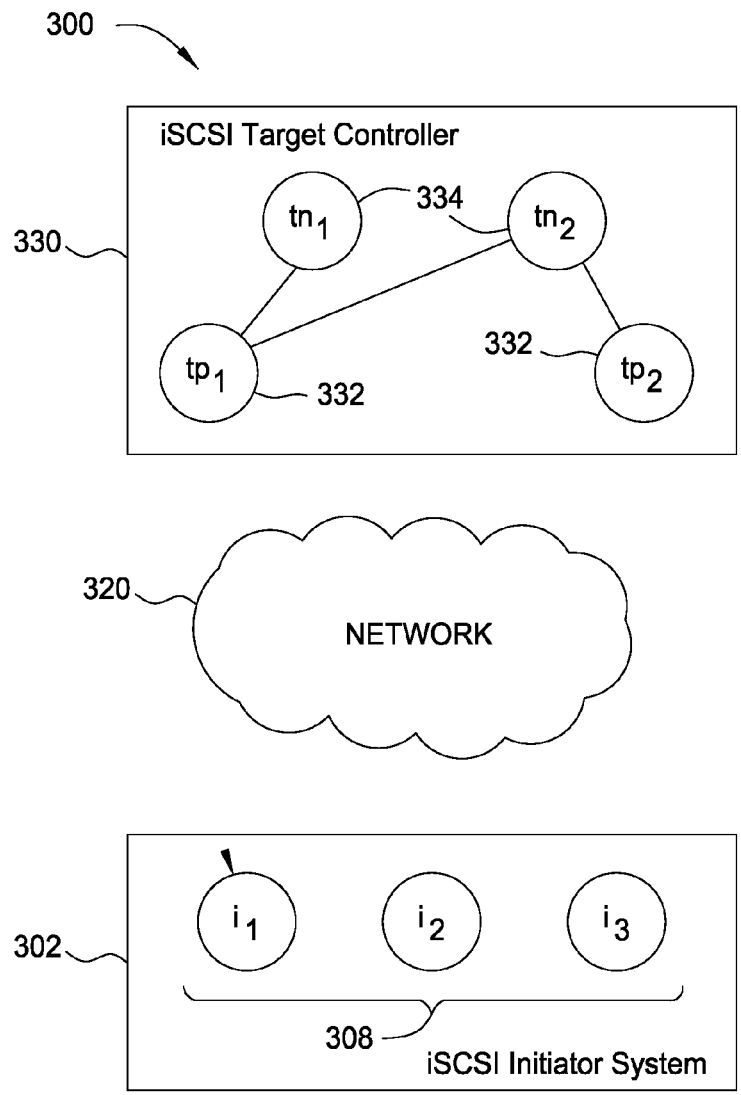
FIGS. 3A-3C illustrate examples of multi-path sessions established for an initiator system with multiple initiator ports, according to one embodiment of the invention.
Figure 3B:
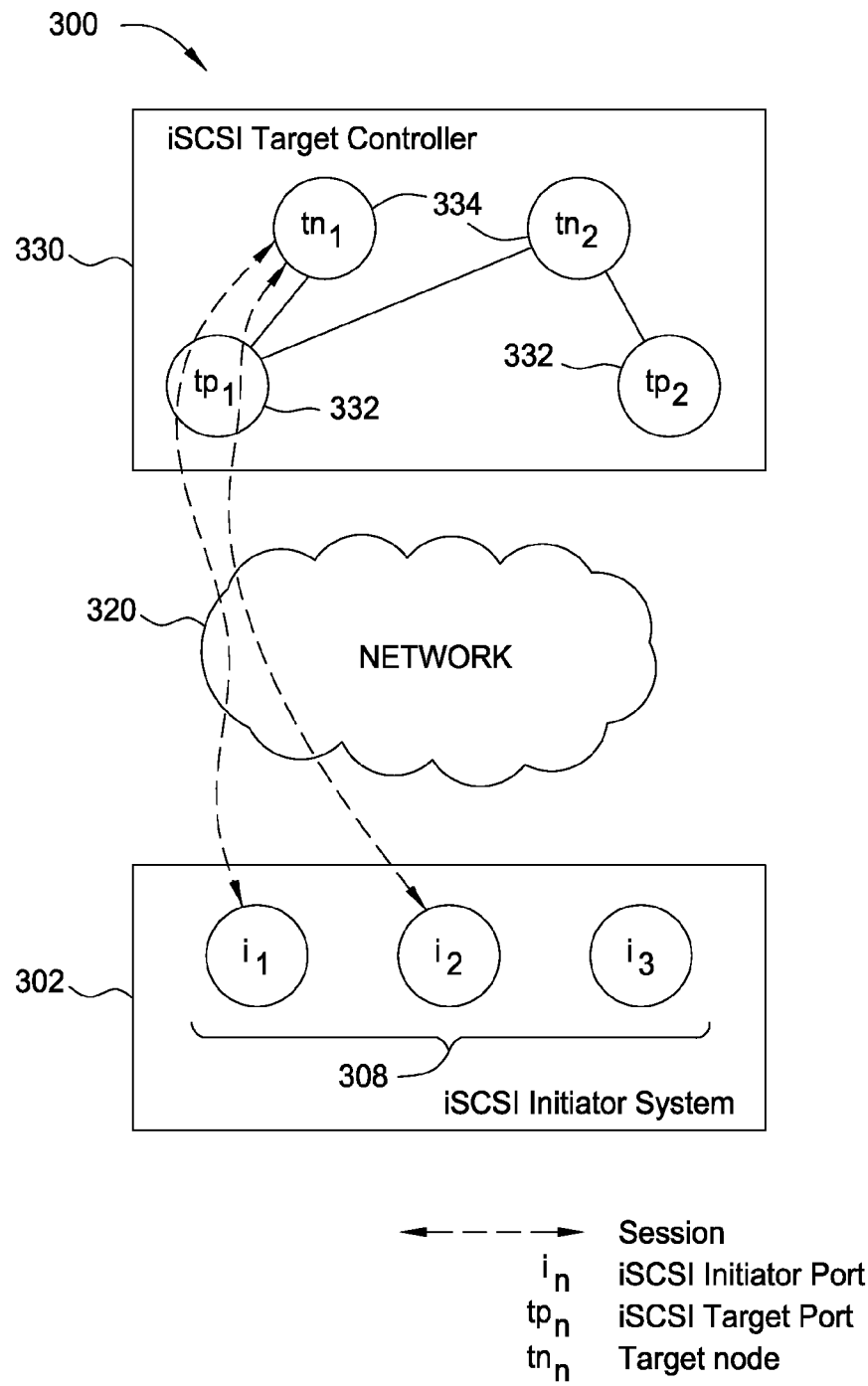
Figure 3C:
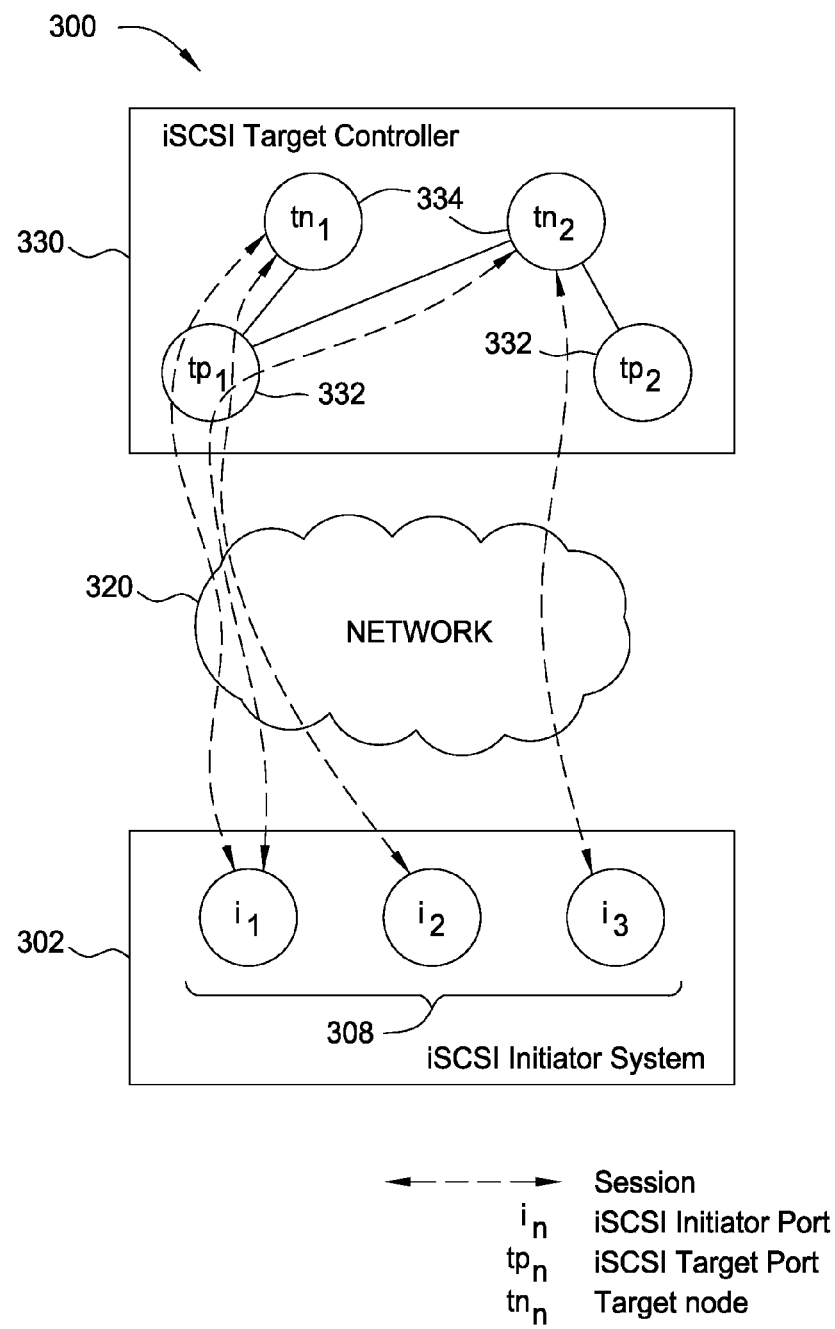

FIGS. 3A-3C illustrate examples of multi-path sessions established for an initiator system 302 with multiple initiator ports, according to one embodiment of the invention FIG. 3A illustrates an example configuration of ports and nodes on a SAN 300. As shown, SAN 300 includes an initiator system 302, a network 320, and an iSCSI target controller 330. In this example, initiator system 302 includes three initiator ports 308 labeled "$i_{1-3}$." Also, the iSCSI target controller 330 includes two target ports 332 labeled "$tp_{1-2}$" and two target nodes 334 labeled "$tn_{1-2}$." Illustratively, the lines connecting target ports 332 and target nodes 334 indicate which target ports 332 provide access to which target nodes 334. As shown, target node 334 $tn_1$ can be accessed only through target port 332 $tp_1$. In contrast, target node 334 $tn_2$ can be accessed through both target ports 332 $tp_{1-2}$.

FIG. 3B illustrates example sessions established in SAN 300. In an initiator system 302 with multiple initiator ports 308, the multi-path session manager 114 may be configured to establish sessions with each target node 334 as follows. If a target node 334 is only associated with a single target port 332, the session manager 114 may establish a limited number of sessions to the target node 334 using multiple initiator ports 308 and the single target port 332.

In one embodiment, the maximum number of sessions to a single target node 334 established using multiple initiator ports 308 may be defined as a system parameter set by an administrator. In this example, assume the system parameter specifies a maximum number of two sessions may be established between any single target node 334 and multiple initiator ports 308. FIG. 3B shows this result. Illustratively, target node 334 $tn_1$ is associated with only a single target port 332, namely, target port 332 $tp_1$. Accordingly, the session manager 114 establishes a limited number of sessions (two) with this target node 334 $tn_1$, using initiator ports 308 $i_{1-2}$, and the single target port 332 $tp_1$, represented using dashed arrow.

If a target node 334 is associated with multiple target ports 332, (e.g., target node 334 $tn_2$), the session manager 114 may be configured to determine whether the number of target ports 332 exceeds the number of initiator ports 308. If the number of target ports 332 exceeds the number of initiator ports 308, the session manager 114 may be configured to establish sessions to the target node 334 with each initiator port 308. Further, the session manager 114 balances the number of sessions through each target port 332 as evenly as possible. Alternatively, if the number of target ports 332 is less than or equal to the number of initiator ports 308, the session manager 114 may be configured to establish sessions to the target node 334 through each target port 308.

In one embodiment, the session manager 114 may be configured to balance the number of sessions from each initiator port 308. As shown in FIG. 3C, for example, target node 334 $tn_2$ is associated with target ports 332 $tp_{1-2}$. Accordingly, session manager 114 determines that number of target ports 332 does not exceed the number of initiator ports 308. Specifically, as shown in FIG. 3C, the number of target ports 332 (two) is less than the number of initiator ports 308 (three).

Accordingly, the session manager 114 establishes sessions to the target node 334 $tn_2$, through each target port 332 $tp_{1-2}$. In one embodiment, to balance the number of sessions with each initiator port 308, the session manager 114 may use the initiator port 308 with the least number of sessions when establishing a new session. If the number of sessions at each initiator port is equal to one another, the session manager 114 may use a round robin scheme to distribute new sessions.

As shown in FIG. 3C, a first session to target node 334 $tn_2$ uses the initiator port 308 $i_3$ and target port 332 $tp_2$. Another session uses initiator port 308 $i_1$, and target port 332 $tp_1$. In this example, to balance the sessions, each initiator port 308 is used in a first session before a second session is added to initiator port 308 $i_1$.

Note, however, the session manager 114 does not require direct knowledge of the network topology of SAN 300. It is not uncommon to have a topology that limits communication between various initiator ports 308 and target ports 332. Accordingly, some session establishment attempts may fail. However, embodiments of the invention may be used to establish multi-path sessions for an arbitrary network topology. If an attempt to establish a target node 334 fails, the session manager 114 may be configured to attempt to establish a session to the target node 334 through the same target port 332, but using a different initiator port 308, cycling through each initiator port 308 until a sessions has been established, or until all possible attempts have failed.

Figure 4:
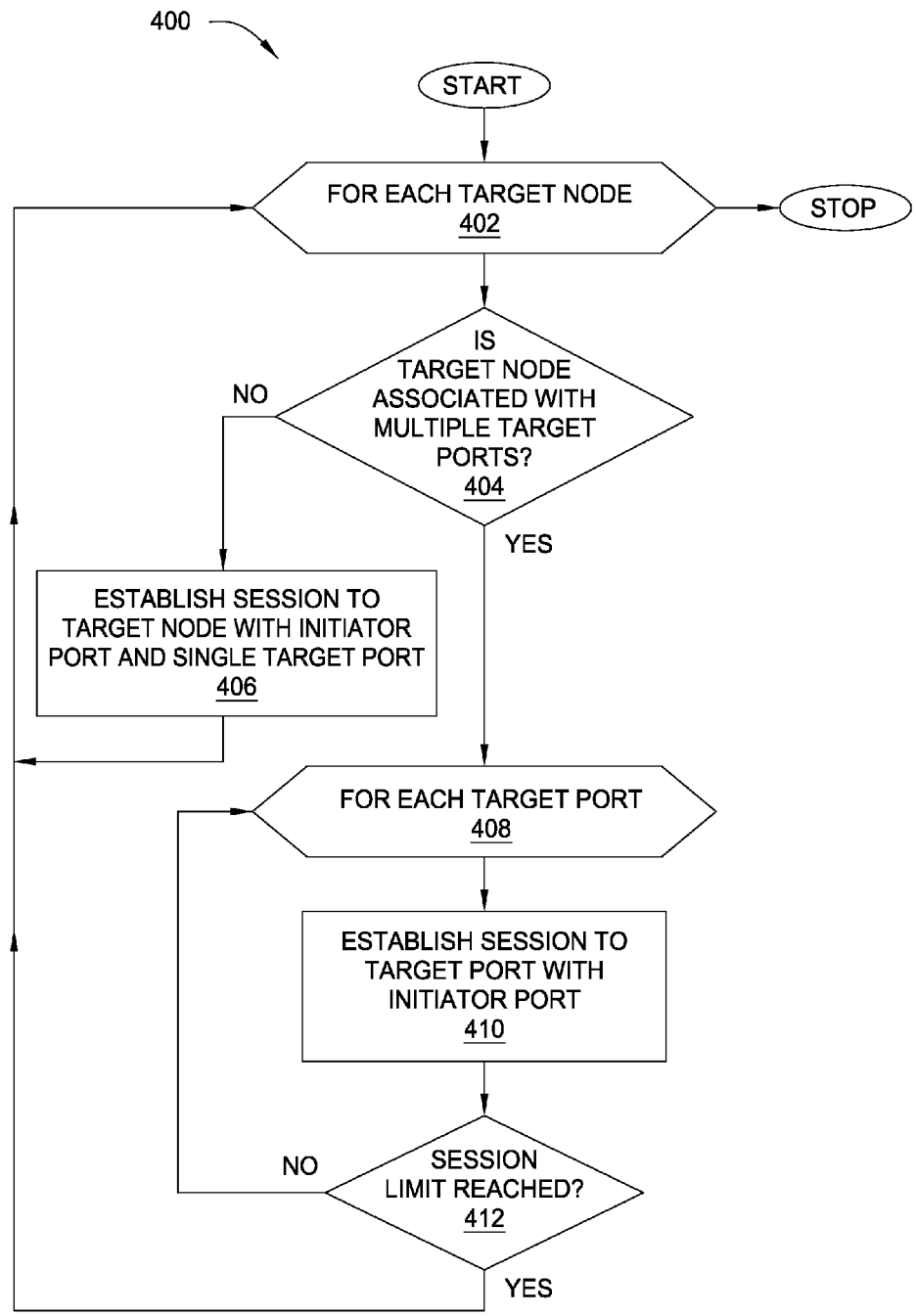
FIG. 4 is a flowchart illustrating a process for multi-path iSCSI session establishment between an initiator system with a single initiator port and a target controller, according to one embodiment of the invention.

FIG. 4 is a flowchart illustrating a process 400 for multi-path iSCSI session establishment between an initiator system with a single initiator port and a target controller, according to one embodiment of the invention. As shown, process 400 begins with a loop at step 402. The loop 402 includes steps 404-412 performed to establish sessions for each target node 134 of the iSCSI target controller 130. At step 404, the session manager 114 determines whether the target node 134 is associated with multiple target ports 132. If not, at step 406, the session manager 114 establishes a session to the target node 134 with the single initiator port 108 and the single target port 132. The process 400 then returns to step 402 to establish sessions for another target node 134.

If the target node 134 is associated with multiple target ports 132, then another loop begins at step 408. The loop beginning at step 408 includes steps 410 and 412 for each target port 132 (that can be used to access target node 134) on the iSCSI target controller 130. At step 410, the session manager 114 establishes a session to the target node 134 using the single initiator port 108, and the target port 132. At step 412, the session manager 114 may determine whether the maximum number of sessions has been established for the target node being evaluated. If not, the process 400 returns to step 408 for another target port 132. If the session limit has been reached, the process returns to step 402 to establish sessions for another target node 134. As stated, the maximum number of sessions may be specified as a system parameter. As each additional session to the target node provides failover capability, the more sessions established, the more fault-tolerant the overall system becomes. However the benefit of additional redundancy may be outweighed by the overhead required to create and manage additional connections. Thus, the maximum number of sessions may be used to balance these competing concerns.

Figure 5:
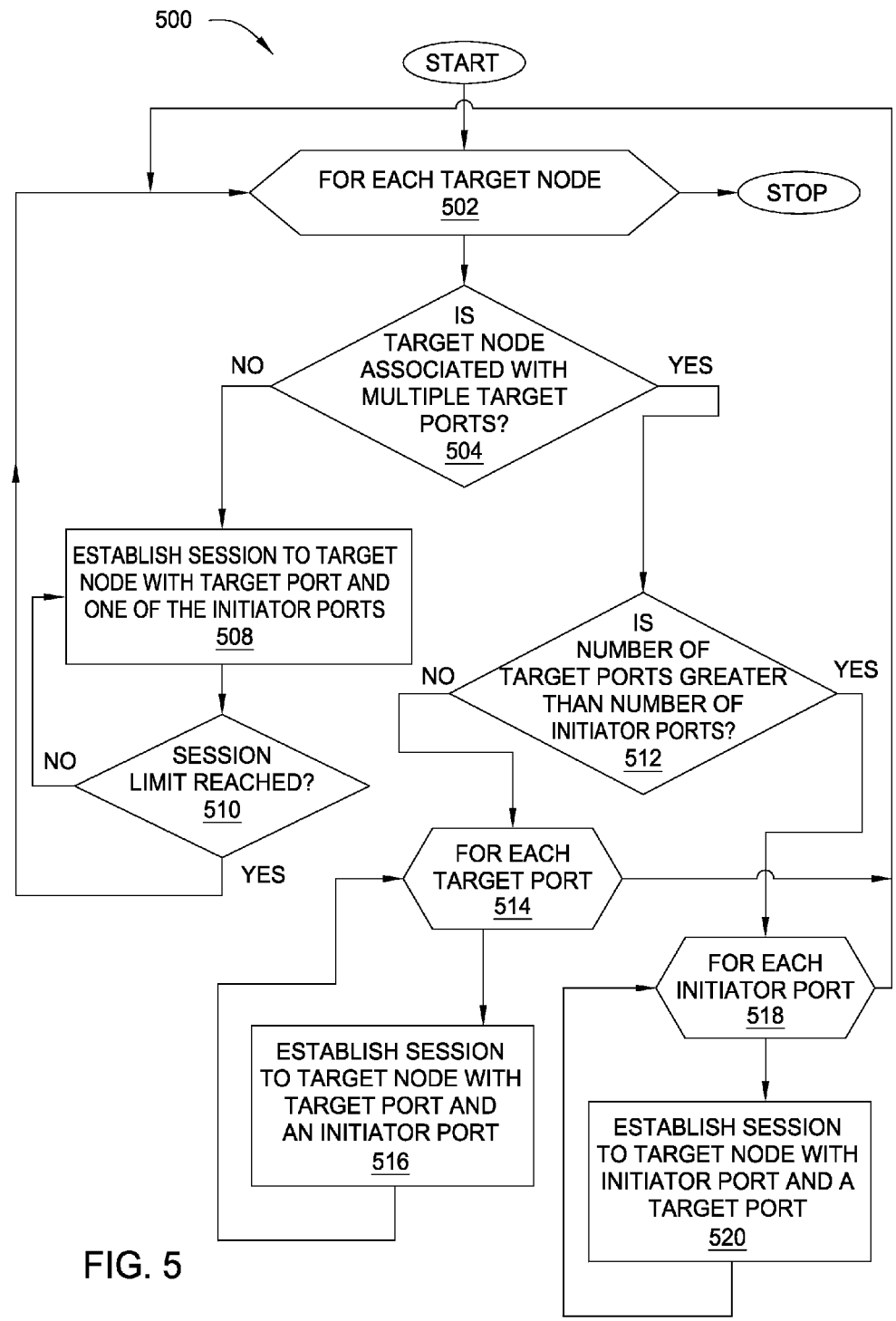
FIG. 5 is a flowchart depicting a process for multi-path iSCSI session establishment between an initiator system with multiple initiator ports and a target controller, according to one embodiment of the invention.

FIG. 5 is a flowchart depicting a process 500 for multi-path iSCSI session establishment between an initiator system with multiple initiator ports and a target controller, according to one embodiment of the invention. As shown, process 500 begins with a loop at step 502. The loop 502 includes steps 504-520 for each target node 134 present on an iSCSI target controller 130.

At step 504, the session manager 114 determines whether the target node 134 is associated with multiple target ports 132. If not, at step 508, the session manager 114 establishes a session to the target node 134 using one of the initiator ports 108 and the single target port 132. At step 510, the session manager 114 then determines whether the maximum number of sessions has been reached for the target node then being evaluated. If not, the process 500 then returns to step 508. If the session manager 114 determines that the session limit has been reached, the process 500 then loops back to step 502 and establishes sessions for another target node 134.

If, at step 504, the session manager 114 determines that the target node 134 being evaluated is associated with multiple target ports 132, then the process 500 continues to step 512. At step 512, the session manager 114 determines whether the number of target ports 132 exceeds the number of initiator ports 108. If not, a loop begins at step 514 that includes step 516 for each target port 132. At step 516, the session manager 114 establishes a session to the target node 134 using the target port 132 and an initiator port 108 such that the session load is balanced among the initiator ports 108 present on initiator system 102. For example, the session manager may each new session using the least-used initiator port 108, and then a round robin scheme to select between equally-used initiator ports 108. At the conclusion of the loop, the process 500 returns to step 502 and establishes sessions for another target node 134.

If, however, at step 512, the session manager 114 determines that the number of target ports 132 exceeds the number of initiator ports 108, a loop begins at step 518 that includes step 520 for each initiator port 108. At step 520, the session manager 114 establishes a session to the target node 134 using the initiator port 108 and a target port 132 such that the session load is balanced as evenly as possible amongst all the target ports 132. By using the least-used target port 132, the session manager 114 may balance the session load as evenly as possible amongst target ports 132. At the conclusion of the loop, the process returns to step 502 for another target node 134.

As described above, embodiments of the invention allow network sessions to be established for a network with an arbitrary topology. Embodiments of the invention may be used, for example, to establish multiple iSCSI sessions to provide load balancing and failover capability for a network topology that allows multiple sessions to the same target node. In one embodiment, the iSCSI initiator system may be configured to automatically establish multiple iSCSI sessions by iterating over known initiator and target ports/nodes against a set of pre-defined rules. Doing so allows the initiator system to create multiple iSCSI sessions to provide load balancing and failover capability, without requiring the initiator system to have detailed knowledge of the network topology.

While the foregoing is directed to embodiments of the present invention, other and further embodiments of the invention may be devised without departing from the basic scope thereof, and the scope thereof is determined by the claims that follow.

What is claimed is:

1. A method of establishing multiple network sessions over an arbitrary network topology, comprising:
receiving network configuration information related to the arbitrary network topology and describing an initiator system that contains a plurality of initiator ports and describing a target controller that contains a plurality of target ports, wherein each of the plurality of target ports is communicatively coupled with one or more target nodes, and wherein the arbitrary network topology limits communications between various initiator ports in the plurality of initiator ports and various target ports in the plurality of target ports;
determining a count of network sessions to establish between the initiator system and a first target node, using a set of pre-defined rules defining logic for calculating the count of network sessions based on a count of the plurality of initiator ports, a count of the plurality of target ports, and a predefined system parameter specifying a maximum number of sessions to establish to each target node; and
establishing a plurality of network sessions between the plurality of initiator ports of the initiator system and the first target node, using the plurality of initiator ports and the plurality of target ports, according to the determined count of network sessions, based on the network configuration information, comprising:
upon determining that the count of the one or more target ports is less than the count of the plurality of initiator ports, establishing the plurality of network sessions such that the network sessions are load-balanced amongst the plurality of initiator ports, wherein two or more of the plurality of network sessions are established to a first one of the one or more target ports using two or more of the plurality of initiator ports.

2. The method of claim 1, wherein each network session is an iSCSI session between one of the initiator ports on the initiator system and the target node through one of the target ports, established according to an iSCSI protocol.

3. The method of claim 1, wherein:
establishing the plurality of network sessions comprises:
upon determining whether one of the target nodes is communicatively coupled with a plurality of target ports:
determining whether the count of target ports exceeds the count of initiator ports, and if so:
establishing a network session between each of the plurality of initiator ports and the target node through one of the plurality of target ports.

4. The method of claim 3, wherein establishing the plurality of network sessions further comprises:
upon determining that the count of target ports is less than or equal to the count of initiator ports, establishing a network session between one of the plurality of initiator ports and the target node through each of the plurality of communicatively coupled target ports.

5. The method of claim 1, further comprising:
determining whether a second one of the target nodes is communicatively coupled with only a single target port, and if so:
establishing a second plurality of network sessions between the plurality of initiator ports and the target node through the single target port based on a user-specified limit on a number of sessions.

6. The method of claim 1, further comprising:
upon determining that the establishment of one of the plurality of network sessions using a first initiator port and a first target port of the plurality of target ports has failed, attempting to establish a network session between the initiator system and the first target port using a second initiator port, separate and distinct from the first initiator port.

7. The method of claim 6, further comprising:
cycling through each of the plurality of initiator ports, attempting to establish a network session between the initiator system and the target port using each respective initiator port of the plurality of initiator ports, separate and distinct from the first initiator port.

8. The method of claim 1, wherein establishing the plurality of network sessions further comprises:
for each of the plurality of target nodes:
upon determining that the respective target node is communicatively coupled with a plurality of target ports, and upon further determining that the number of communicatively coupled target ports exceeds the number of initiator ports, establishing a network session between each of the plurality of initiator ports and the respective target node through one of the plurality of communicatively coupled target ports.

9. The method of claim 8, wherein:
upon determining that the number of communicatively coupled target ports is less than or equal to the number of initiator ports, establishing a network session between each of the plurality of initiator ports and the target node through one of the plurality of communicatively coupled target ports.

10. A computer readable storage medium containing a program which, when executed, performs an operation, comprising:
receiving network configuration information related to the arbitrary network topology and describing an initiator system that contains a plurality of initiator ports and describing a target controller that contains a plurality of target ports, wherein each of the plurality of target ports is communicatively coupled with one or more target nodes, and wherein the arbitrary network topology limits communications between various initiator ports in the plurality of initiator ports and various target ports in the plurality of target ports;
determining a count of network sessions to establish between the initiator system and a first target node, using a set of pre-defined rules defining logic for calculating the count of network sessions based on a count of the plurality of initiator ports, a count of the plurality of target ports, and a predefined system parameter specifying a maximum number of sessions to establish to each target node; and
establishing a plurality of network sessions between the plurality of initiator ports of the initiator system and the first target node, using the plurality of initiator ports and the plurality of target ports, according to the determined count of network sessions, based on the network configuration information, comprising:
upon determining that the count of the one or more target ports is less than the count of the plurality of initiator ports, establishing the plurality of network sessions such that the network sessions are load-balanced amongst the plurality of initiator ports, wherein two or more of the plurality of network sessions are established to a first one of the one or more target ports using two or more of the plurality of initiator ports.

11. The computer readable storage medium of claim 10, wherein each network session is an iSCSI session between one of the initiator ports on the initiator system and the target node through one of the target ports, established according to an iSCSI protocol.

12. The computer readable storage medium of claim 10, wherein:
    establishing the plurality of network sessions comprises:
        upon determining whether one of the target nodes is communicatively coupled with a plurality of target ports:
            determining whether the count of target ports exceeds the count of initiator ports, and if so:
                establishing a network session between each of the plurality of initiator ports and the target node through one of the plurality of target ports.

13. The computer readable storage medium of claim 12, wherein establishing the plurality of network sessions further comprises:
    upon determining that the count of target ports is less than or equal to the count of initiator ports, establishing a network session between one of the plurality of initiator ports and the target node through each of the plurality of communicatively coupled target ports.

14. The computer readable storage medium of claim 10, further comprising:
    determining whether a second one of the target nodes is communicatively coupled with only a single target port, and if so:
    establishing a second plurality of network sessions between the plurality of initiator ports and the target node through the single target port based on a user-specified limit on a number of sessions.

15. The computer readable storage medium of claim 10, wherein:
    upon determining that the number of associated target ports communicatively coupled with the respective target node is less than or equal to the number of initiator ports, establishing a network session between each of the plurality of initiator ports and the target node through one of the plurality of communicatively coupled target ports.

16. A system, comprising:
    a processor; and
    a memory containing a program that, when executed by the processor:
        receives network configuration information related to the arbitrary network topology and describing an initiator system that contains a plurality of initiator ports and describing a target controller that contains a plurality of target ports, wherein each of the plurality of target ports is communicatively coupled with one or more target nodes, and wherein the arbitrary network topology limits communications between various initiator ports in the plurality of initiator ports and various target ports in the plurality of target ports;
        determines a count of network sessions to establish between the initiator system and a first target node, using a set of pre-defined rules defining logic for calculating the count of network sessions based on a count of the plurality of initiator ports, a count of the plurality of target ports, and a predefined system parameter specifying a maximum number of sessions to establish to each target node; and
        establishes a plurality of network sessions between the plurality of initiator ports of the initiator system and the first target node, using the plurality of initiator ports and the plurality of target ports, according to the determined count of network sessions, based on the network configuration information, comprising:
            upon determining that the count of the one or more target ports is less than the count of the plurality of initiator ports, establishing the plurality of network sessions such that the network sessions are load-balanced amongst the plurality of initiator ports, wherein two or more of the plurality of network sessions are established to a first one of the one or more target ports using two or more of the plurality of initiator ports.

17. The system of claim 16, wherein each network session is an iSCSI session between one of the initiator ports on the initiator system and the target node through one of the target ports, established according to an iSCSI protocol.

\* \* \* \* \*